US011966183B2

(12) United States Patent
Sakurai

(10) Patent No.: US 11,966,183 B2
(45) Date of Patent: Apr. 23, 2024

(54) SHEET CONVEYANCE APPARATUS AND IMAGE FORMING APPARATUS

(71) Applicant: CANON KABUSHIKI KAISHA, Tokyo (JP)

(72) Inventor: Takanori Sakurai, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/949,509

(22) Filed: Sep. 21, 2022

(65) Prior Publication Data

US 2023/0016356 A1 Jan. 19, 2023

Related U.S. Application Data

(63) Continuation of application No. 16/693,823, filed on Nov. 25, 2019, now Pat. No. 11,480,903.

(30) Foreign Application Priority Data

Dec. 11, 2018 (JP) ................................ 2018-231965

(51) Int. Cl.
*G03G 15/23* (2006.01)
*B65H 5/06* (2006.01)
(Continued)

(52) U.S. Cl.
CPC ........... *G03G 15/234* (2013.01); *B65H 5/062* (2013.01); *B65H 9/006* (2013.01); *B65H 9/166* (2013.01);
(Continued)

(58) Field of Classification Search
CPC ............. G03G 15/234; G03G 15/6561; G03G 15/6567; G03G 15/6579;
(Continued)

(56) References Cited

U.S. PATENT DOCUMENTS 6,292,650 B1 * 9/2001 Akiyama ............. G03G 15/234 399/401
7,379,702 B2 5/2008 Kim
(Continued)

FOREIGN PATENT DOCUMENTS

CN 103863857 A 6/2014
CN 106185396 A 12/2016
(Continued)

OTHER PUBLICATIONS

Non-Final Office Action issued in U.S. Appl. No. 16/693,823 dated Apr. 7, 2021.
(Continued)

*Primary Examiner* — Justin N Olamit
(74) *Attorney, Agent, or Firm* — ROSSI, KIMMS & McDOWELL LLP

(57) ABSTRACT

A sheet conveyance apparatus includes a first conveyance portion configured to convey a sheet, a second conveyance portion configured to convey the sheet, the second conveyance portion including an abutment portion configured to form a loop on the sheet by being abutted against a leading edge of a sheet conveyed by the first conveyance portion, a curved guide portion, which is curved, configured to guide the sheet conveyed by the first conveyance portion to the second conveyance portion, and a rotary member arranged downstream of the first conveyance portion and upstream of the second conveyance portion in a sheet conveyance direction, and configured to be driven to rotate by a surface of the sheet that is guided by the curved guide portion, the surface sliding against the curved guide portion.

16 Claims, 12 Drawing Sheets

(51) Int. Cl.

| | |
|---|---|
| ***B65H 9/00*** | (2006.01) |
| ***B65H 9/16*** | (2006.01) |
| ***G03G 15/00*** | (2006.01) |

(52) U.S. Cl.
CPC ..... *G03G 15/6561* (2013.01); *G03G 15/6567* (2013.01); *G03G 15/6579* (2013.01); *B65H 2404/14* (2013.01); *G03G 2215/00405* (2013.01); *G03G 2215/00438* (2013.01); *G03G 2215/00586* (2013.01); *G03G 2215/00679* (2013.01)

(58) Field of Classification Search
CPC . G03G 2215/00405; G03G 2215/0043; G03G 2215/00438; G03G 2215/00586; G03G 2215/00679; B65H 5/062; B65H 5/006; B65H 5/166; B65H 2404/14; B65H 2404/167; B65H 2601/521; B65H 2601/522; B41J 13/0045
See application file for complete search history.

(56) References Cited

U.S. PATENT DOCUMENTS

| | | | | |
|---|---|---|---|---|
| 7,661,673 | B2 | 2/2010 | Doyo | |
| 8,452,224 | B2 * | 5/2013 | Ishioka | G03G 15/6573 399/397 |
| 8,493,639 | B2 * | 7/2013 | Samoto | B65H 3/0684 271/225 |
| 8,616,550 | B2 * | 12/2013 | Ishii | B65H 85/00 271/291 |
| 8,807,559 | B2 * | 8/2014 | Osada | B65H 9/06 271/245 |
| 8,991,824 | B2 | 3/2015 | Suzuki | |
| 9,284,157 | B2 * | 3/2016 | Won | G03G 15/234 |
| 9,688,495 | B2 | 6/2017 | Hirahara | |
| 9,988,226 | B2 | 6/2018 | Hamaya et al. | |
| 10,530,950 | B2 * | 1/2020 | Watanabe | B65H 5/062 |
| 10,609,235 | B2 | 3/2020 | Shiokawa et al. | |
| 10,787,332 | B2 | 9/2020 | Matsui et al. | |

FOREIGN PATENT DOCUMENTS

| | | | |
|---|---|---|---|
| JP | 2007326702 | A | 12/2007 |
| JP | 2013171092 | A | 9/2013 |
| JP | 2017190209 | A | 10/2017 |
| JP | 2018177379 | A | 11/2018 |

OTHER PUBLICATIONS

Final Office Action issued in U.S. Appl. No. 16/693,823 dated Jul. 29, 2021.
Non-Final Office Action issued in U.S. Appl. No. 16/693,823 dated Mar. 7, 2022.
Notice of Allowance issued in U.S. Appl. No. 16/693,823 dated Jun. 27, 2022.
Office Action issued in Chinese Appln. No. 201911237748.2 dated Sep. 29, 2022. English translation provided.

* cited by examiner

SHEET CONVEYANCE APPARATUS AND IMAGE FORMING APPARATUS

BACKGROUND OF THE INVENTION

Field of the Invention

The present invention relates to a sheet conveyance apparatus for conveying sheets, and an image forming apparatus equipped with the same.

Description of the Related Art

Generally, an image forming apparatus in which a sheet having an image formed on a first side is guided again to an image forming portion through a reverse conveyance path and a duplex printing conveyance path to have an image formed on a second side of the sheet in the image forming portion. Hitherto, an image forming apparatus is proposed in which a sheet is guided to a loop roller pair on a main conveyance path from a duplex printing conveyance path, and the sheet is abutted against a registration roller pair in a non-movement state by the loop roller pair to correct skewing of the sheet (refer to Japanese Patent Application Laid-Open Publication No. 2017-190209).

According to the image forming apparatus disclosed in the above-mentioned Japanese Patent Application Laid-Open Publication No. 2017-190209, a vicinity of a merging portion where the duplex printing conveyance path and a main conveyance path merge is designed to be curved, so as to downsize the image forming apparatus. However, if a sheet is to be passed through the curved conveyance path which is curved as described above, the sheet will be pressed against a curved guide constituting the curved conveyance path, and frictional resistance between the sheet and the curved guide will increase.

For example, in the image forming apparatus disclosed in Japanese Patent Application Laid-Open Publication No. 2017-190209, if the loop roller pair conveys the sheet further in a state where a leading edge of the sheet is abutted against the registration roller pair, a loop is formed on the sheet. If the sheet is pressed against the curved guide in this state, frictional resistance between the sheet and the curved guide will increase, and sheet conveyance force from the loop roller pair will not be transmitted smoothly to the leading edge of the sheet. Thereby, the force in which the leading edge of the sheet is pressed against a nip formed by the registration roller pair is reduced, and skew correction performance is deteriorated.

SUMMARY OF THE INVENTION

According to one aspect of the present invention, a sheet conveyance apparatus includes a first conveyance portion configured to convey a sheet, a second conveyance portion configured to convey the sheet, the second conveyance portion including an abutment portion configured to form a loop on the sheet by being abutted against a leading edge of a sheet conveyed by the first conveyance portion, a curved guide portion, which is curved, configured to guide the sheet conveyed by the first conveyance portion to the second conveyance portion, and a rotary member arranged downstream of the first conveyance portion and upstream of the second conveyance portion in a sheet conveyance direction, and configured to be driven to rotate by a surface of the sheet that is guided by the curved guide portion, the surface sliding against the curved guide portion.

Further features of the present invention will become apparent from the following description of exemplary embodiments with reference to the attached drawings.

DESCRIPTION OF THE EMBODIMENTS

First Embodiment

General Configuration

Figure 1:
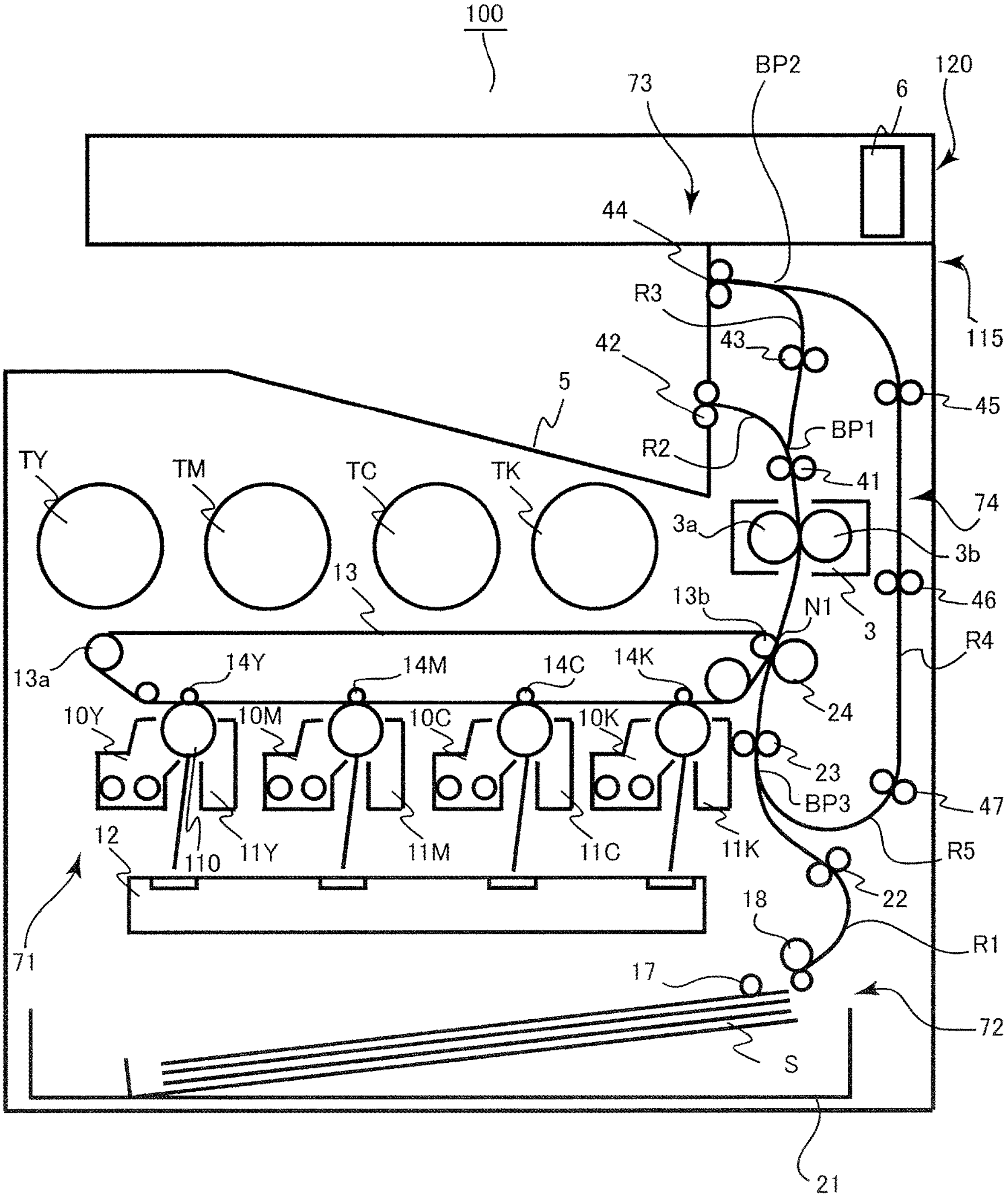
FIG. 1 is an entire schematic diagram illustrating a printer according to a first embodiment.

A first embodiment of the present invention will be described. A printer 100 serving as an image forming apparatus is a full-color laser beam printer adopting an electrophotographic system. The printer 100 includes, as illustrated in FIG. 1, a printer body 115, and a reading apparatus 120 arranged on an upper portion of the printer body 115.

The printer body 115 includes an image forming unit 71 for forming an image on a sheet S, a sheet feed unit 72, a fixing unit 3, a sheet discharging and reversing portion 73, and a duplex printing conveyance portion 74. The image forming unit 71 includes four drum units 11Y, 11M, 11C and 11K, four image developing units 10Y, 10M, 10C and 10K, toner storage portions TY, TM, TC and TK, and a scanner unit 12. Respective drum units and respective image developing units are detachably mounted to the printer body 115. The four drum units 11Y, 11M, 11C and 11K and the four image developing units 10Y, 10M, 10C and 10K adopt the same configuration except for the difference in the color of the image being formed. Therefore, the configuration and image forming process of only the drum unit 11Y and the image developing unit 10Y will be described, and the description of other drum units and image developing units are omitted.

The drum unit 11Y includes a photosensitive drum 110, a charging unit not shown, and a cleaning unit not shown. The photosensitive drum 110 is configured by applying an organic photoconductive layer on an outer circumference of an aluminum cylinder, and it is driven to rotate by a drive motor not shown. The cleaning unit cleans toner that has not been transferred from the photosensitive drum 110 during the image forming process.

An intermediate transfer belt 13 wound around a drive roller 13*a* and a secondary transfer counter roller 13*b* is provided in the image forming unit 71, and on the inner side of the intermediate transfer belt 13 are provided primary transfer rollers 14Y, 14M, 14C and 14K. Further, a secondary transfer roller 24 is arranged so as to be opposed to the secondary transfer counter roller 13*b* with the intermediate transfer belt 13 interposed therebetween, and the intermediate transfer belt 13 together with the secondary transfer roller 24 forms a transfer nip N1 that serves as an image forming portion for transferring an image on a sheet S being conveyed.

The sheet feed unit 72 is provided on a lower portion of the printer body 115, and the sheet feed unit 72 includes a cassette 21 that supports sheets S and a pickup roller 17 that feeds the sheets S supported in the cassette 21. Further, the sheet feed unit 72 includes a separation roller pair 18 that separates the sheet S fed by the pickup roller 17 one by one. The fixing unit 3 includes a fixing roller 3*a* having a hollow shape and a pressure roller 3*b*, and on an inner side of the fixing roller 3*a* are provided a heater and a temperature sensor for sensing the temperature of the heater, which are not shown.

We will now describe respective conveyance paths and components for conveying the sheets provided on the printer body 115. The printer body 115 includes a feed conveyance path R1, a sheet discharge conveyance path R2 and a sheet reverse conveyance path R3 which are branched at a branching point BP1 on a downstream end in a sheet conveyance direction of the feed conveyance path R1, and a duplex printing conveyance path R4 to which the sheet reverse conveyance path R3 merges at a merging point BP2. The duplex printing conveyance path R4 guides a sheet on which an image has been formed on a first side at the transfer nip N1 toward the transfer nip N1 again, and the duplex printing conveyance path R4 merges with the feed conveyance path R1 at a merging point BP3.

A sheet discharge roller pair 42 for discharging sheets S onto a sheet discharge tray 5 is provided on the sheet discharge conveyance path R2, and a sheet reverse roller pair 44 capable of rotating in normal and reverse directions for performing switch-back of the sheet S and conveying the sheet in a reversed direction is provided on the duplex printing conveyance path R4. Further, a conveyance roller pair 43 is provided on the sheet reverse conveyance path R3, and conveyance roller pairs 45, 46 and 47 are provided on the duplex printing conveyance path R4. A registration roller pair 23 is provided in a vicinity of the merging point BP3 on the feed conveyance path R1.

Next, an image forming operation of the printer 100 configured as above will be described. In a state where an image data read by a personal computer not shown or the reading apparatus 120 is entered to the scanner unit 12, a laser beam corresponding to the image data is irradiated from the scanner unit 12 to the photosensitive drum 110 of the drum unit 11Y. The image data read by the reading apparatus 120 is sent to a control unit 6 and saved therein.

In this state, the surface of the photosensitive drum 110 is charged uniformly to predetermined polarity and potential by a charging roller, and an electrostatic latent image is formed on the surface by having a laser beam irradiated thereto from the scanner unit 12. The electrostatic latent image formed on the photosensitive drum 110 is developed by the image developing unit 10Y to which toner has been supplied from the toner storage portion TY, and a yellow (Y) toner image is formed on the photosensitive drum 110.

Similarly in the respective photosensitive drums of drum units 11M, 11C and 11K, laser beams are irradiated from the scanner unit 12, and toner images of magenta (M), cyan (C) and black (K) are formed respectively in the image developing units 10M, 10C and 10K. The toner images of respective colors formed on the respective photosensitive drums are transferred by the primary transfer rollers 14Y, 14M, 14C and 14K onto the intermediate transfer belt 13, and conveyed to the transfer nip N1 on the intermediate transfer belt 13 being rotated by the drive roller 13*a*. The image forming processes of respective colors are performed at such a timing that the toner image is superposed on a toner image that has been primarily transferred upstream on the intermediate transfer belt 13 at an upstream portion. Toner remaining on the photosensitive drum 110 after transferring the toner image is collected by a cleaning blade.

In parallel with the image forming process, the sheet S stored in the cassette 21 of the sheet feed unit 72 is sent out by the pickup roller 17 and separated one by one by the separation roller pair 18. Then, the sheet S is subjected to skew correction by a registration roller pair 23 and conveyed at a predetermined conveyance timing that corresponds to a transfer timing of image at the transfer nip N1.

A full-color toner image formed on the intermediate transfer belt 13 is transferred to the sheet S at the transfer nip N1 by secondary transfer bias applied to the secondary transfer roller 24. The sheet S to which the toner image has been transferred is subjected to predetermined heat and pressure by the fixing roller 3*a* and the pressure roller 3*b* of the fixing unit 3, by which toner is melted and fixed to the sheet S. The sheet S having passed through the fixing unit 3 is conveyed by a conveyance roller pair 41 to the sheet discharge conveyance path R2, and discharged onto the sheet discharge tray 5 by the sheet discharge roller pair 42.

If a duplex printing job for forming images on both sides of the sheet is entered, the sheet S having an image formed on a first side and having passed through the fixing unit 3 is guided to the sheet reverse conveyance path R3 by a guide member not shown. In a state where the sheet is conveyed by the conveyance roller pair 43 to the sheet reverse roller pair 44, at first, the sheet reverse roller pair 44 conveys the sheet S to a direction discharging the sheet S to an exterior of the apparatus. Then, after a trailing edge of the sheet S passes the merging point BP2, the sheet reverse roller pair 44 rotates in an opposite direction, and the sheet S reversed by the sheet reverse roller pair 44 is conveyed through the duplex printing conveyance path R4.

The sheet S is conveyed by the conveyance roller pairs 45, 46 and 47 and merges with the feed conveyance path R1 at the merging point BP3. The sheet S merged to the feed conveyance path R1 is subjected to skew correction by the registration roller pair 23, and thereafter, an image is formed on a second side of the sheet S similarly as the first side, before the sheet S is discharged onto the sheet discharge tray 5.

Skew Correction Operation During Duplex Printing

Figure 2:
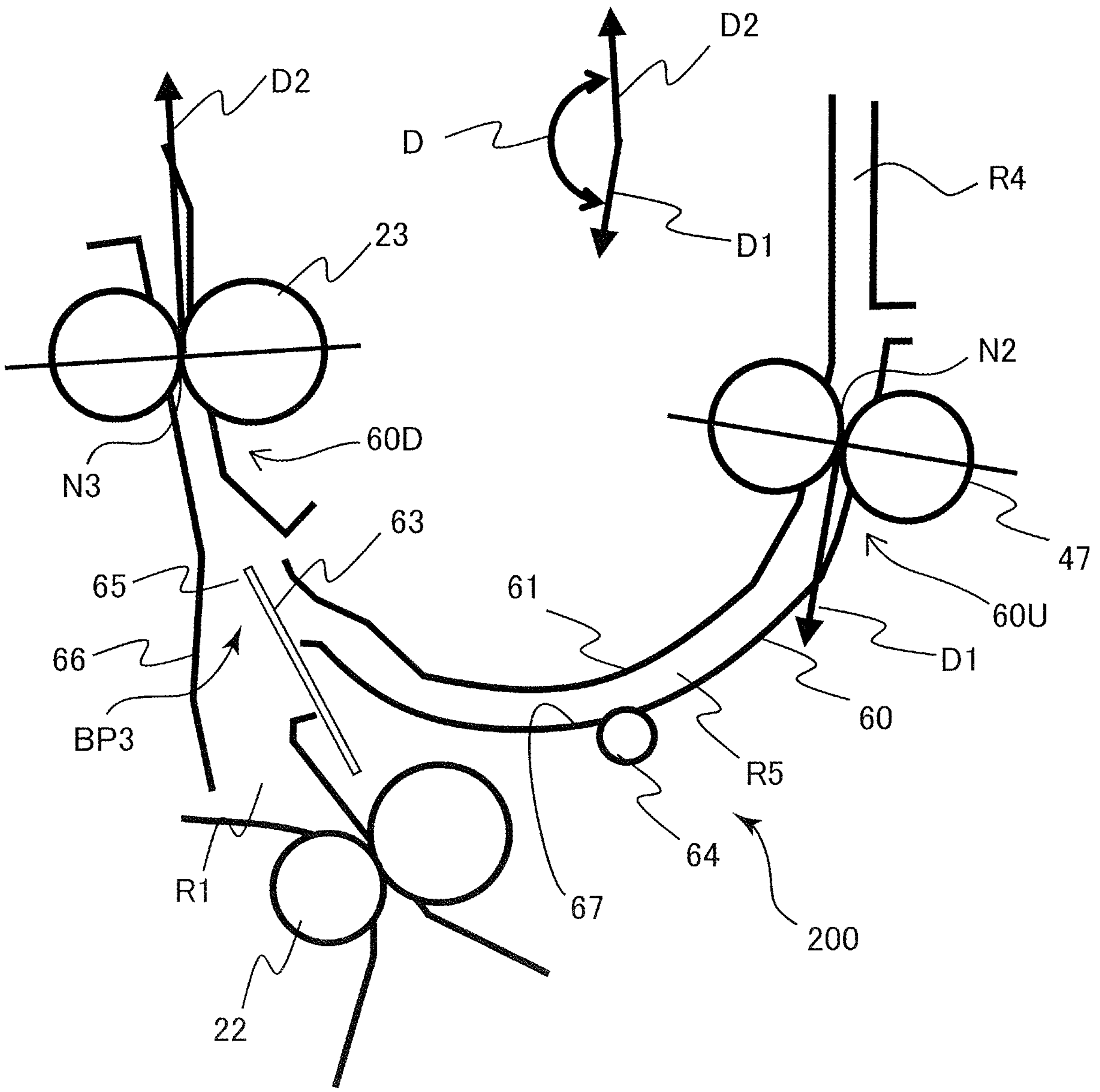
FIG. 2 is a view illustrating a curved conveyance path and a peripheral configuration thereof.

Next, skew correction operation performed to the sheet when the printer 100 carries out a duplex printing job will be described. First, the configuration of the duplex printing conveyance path R4 and the circumference configuration of the registration roller pair 23 will be described. As illustrated in FIG. 2, the duplex printing conveyance path R4 includes a curved conveyance path R5 extending between a conveyance roller pair 47 serving as a first conveyance portion and a first roller pair and the registration roller pair 23 serving as a second conveyance portion and a second roller pair. That is, the curved conveyance path R5 constitutes a portion of the duplex printing conveyance path R4.

The curved conveyance path R5 is formed of an outer guide 60 serving as a curved guide portion, an inner guide 61 opposed to the outer guide 60 and a pre-registration guide 66, wherein the outer guide 60 is arranged outside the inner guide 61 in a direction of curvature of the curved conveyance path R5. That is, at least a portion of the curved conveyance path R5 is formed of the outer guide 60 and the inner guide 61.

A loop space 65 is formed in the vicinity of the merging point BP3 on the curved conveyance path R5, and a merging plate 63 formed of a plate-like member is provided therein. Further, a driven roller 64 is provided along the outer guide 60, and a portion of the driven roller 64 is overlapped with the curved conveyance path R5 when viewed in an axial direction of the driven roller 64. This is realized by the driven roller 64 protruding into the curved conveyance path R5 through a hole 67 formed on the outer guide 60. The driven roller 64 will not nip the sheet with another rotary member. The conveyance roller pair 47, the registration roller pair 23, the outer guide 60 and the driven roller 64 constitute a sheet conveyance apparatus 200 that conveys the sheets S. The driven roller 64 does not nip the sheet being conveyed by the conveyance roller pair 47 and guided by the outer guide 60. In other words, there is no roller provided on the sheet conveyance apparatus 200 that serves to nip and convey the sheet by working together with the driven roller 64.

A direction of conveyance of the sheet by the conveyance roller pair 47, that is, the direction of conveyance of the sheet at a nip N2 of the conveyance roller pair 47 is referred to as a conveyance direction D1, and a direction of conveyance of the sheet by the registration roller pair 23, that is, the direction of conveyance of the sheet at a nip N3 of the registration roller pair 23 is referred to as a conveyance direction D2. In the present embodiment, a relative angle D between the conveyance direction D1 and the conveyance direction D2 is set to 167 degrees. That is, the conveyance direction D1 and the conveyance direction D2 are approximately opposite directions, and the sheet S conveyed in the conveyance direction D1 by the conveyance roller pair 47 is guided by the curved conveyance path R5 to be conveyed approximately in the opposite direction. For example, an angle formed by a vector having the conveyance direction D1 and a vector having the conveyance direction D2 is 120 degrees or greater and 240 degrees or smaller. The conveyance roller pair 47 is provided at an upstream end portion 60U of the curved conveyance path R5 in the sheet conveyance direction, and the registration roller pair 23 is provided at a downstream end portion 60D of the curved conveyance path R5 in the sheet conveyance direction.

Figure 3:
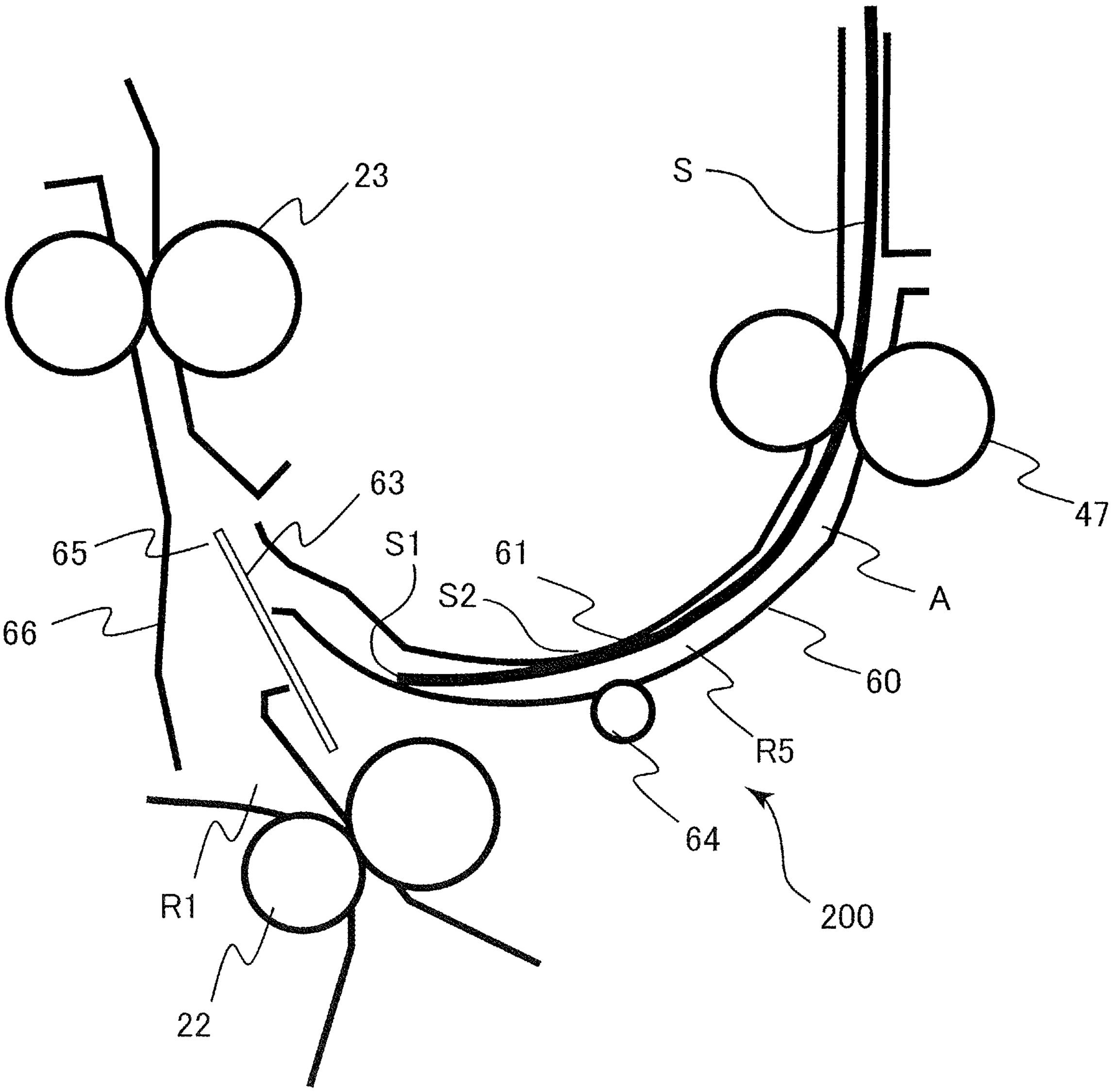
FIG. 3 is a view illustrating a state in which a sheet is sent into the curved conveyance path.

Next, skew correction operation during duplex printing and the state of the sheet S will be described with reference to FIGS. 3 to 7. FIG. 3 is a view illustrating a state in which the sheet S is sent to the curved conveyance path R5. As illustrated in FIG. 3, the sheet S is sent to the curved conveyance path R5 by the conveyance roller pairs 45, 46 and 47 (refer to FIG. 1), during which a leading edge S1 of the sheet S slides against the outer guide 60 and a middle portion S2 thereof slides against the inner guide 61 serving as an opposing guide portion. Then, the sheet S is guided toward the registration roller pair 23 by having its direction of conveyance changed by the outer guide 60 and the inner guide 61.

In this state, the sheet S is supported at three points by the outer guide 60, the inner guide 61 and the conveyance roller pair 47, and a space A can easily be formed between the sheet S and the outer guide 60 by the stiffness of the sheet S itself at an area downstream in the sheet conveyance direction of the conveyance roller pair 47.

Figure 4:
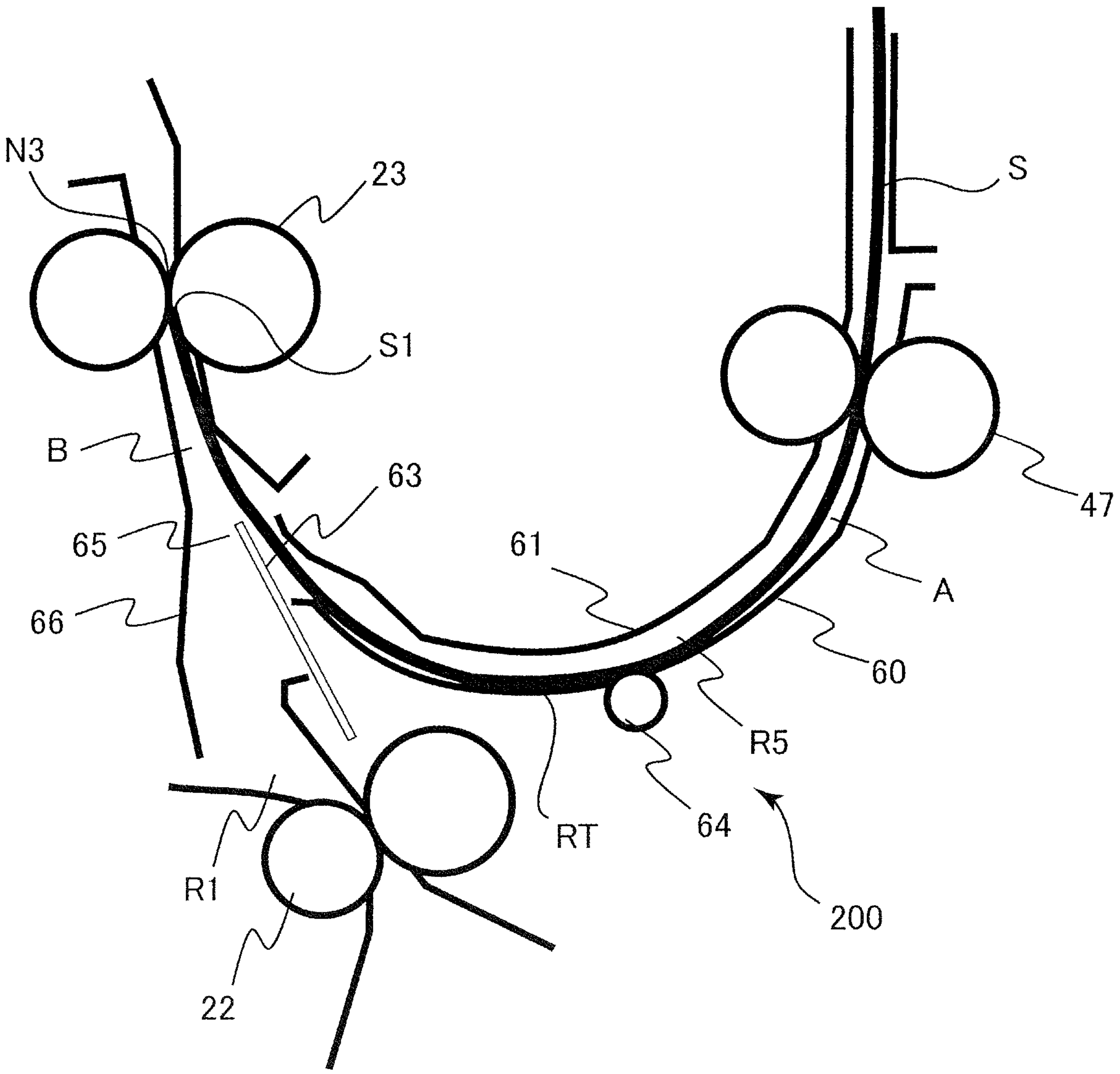
FIG. 4 is a view illustrating a state immediately after a leading edge of a sheet has been abutted against a registration roller pair.

FIG. 4 is a view illustrating a state immediately after the leading edge S1 of the sheet S has been abutted against the registration roller pair 23. As illustrated in FIG. 4, after being guided by the outer guide 60, the leading edge S1 of the sheet S is guided by the merging plate 63 to the registration roller pair 23. Then, the leading edge S1 of the sheet S abuts against the nip N3 of the registration roller pair 23 in a non-movement state. The nip N3 can form a loop on the sheet S by being abutted against the leading edge S1 of the sheet S. The sheet S immediately after abutting against the nip N3 serving as an abutment portion curves in a U-shape, which is approximately arc-shaped, since it has passed through the curved conveyance path R5. In this state, the area of the sheet S near the leading edge S1 is supported by the stiffness of the sheet S itself, and a space B can easily be formed between the pre-registration guide 66 and the sheet S.

The area of the sheet S near the conveyance roller pair 47 is also supported by the stiffness of the sheet S itself and the conveyance roller pair 47, so that the space A between the sheet S and the outer guide 60 can be maintained. Therefore, the area near an apex RT of the U-shaped form of the curve conveyance path R5 between the space A and the space B is the area that comes into strongest contact with the sheet S. Therefore, according to the present embodiment, the driven roller 64 is arranged at a vicinity of the apex RT of the curved conveyance path R5, so that the driven roller 64 reduces a frictional resistance between the sheet S and the outer guide 60. The driven roller 64 serving as a rotary member can be driven to rotate by a surface, sliding against the outer guide 60, of a sheet.

Figure 5:
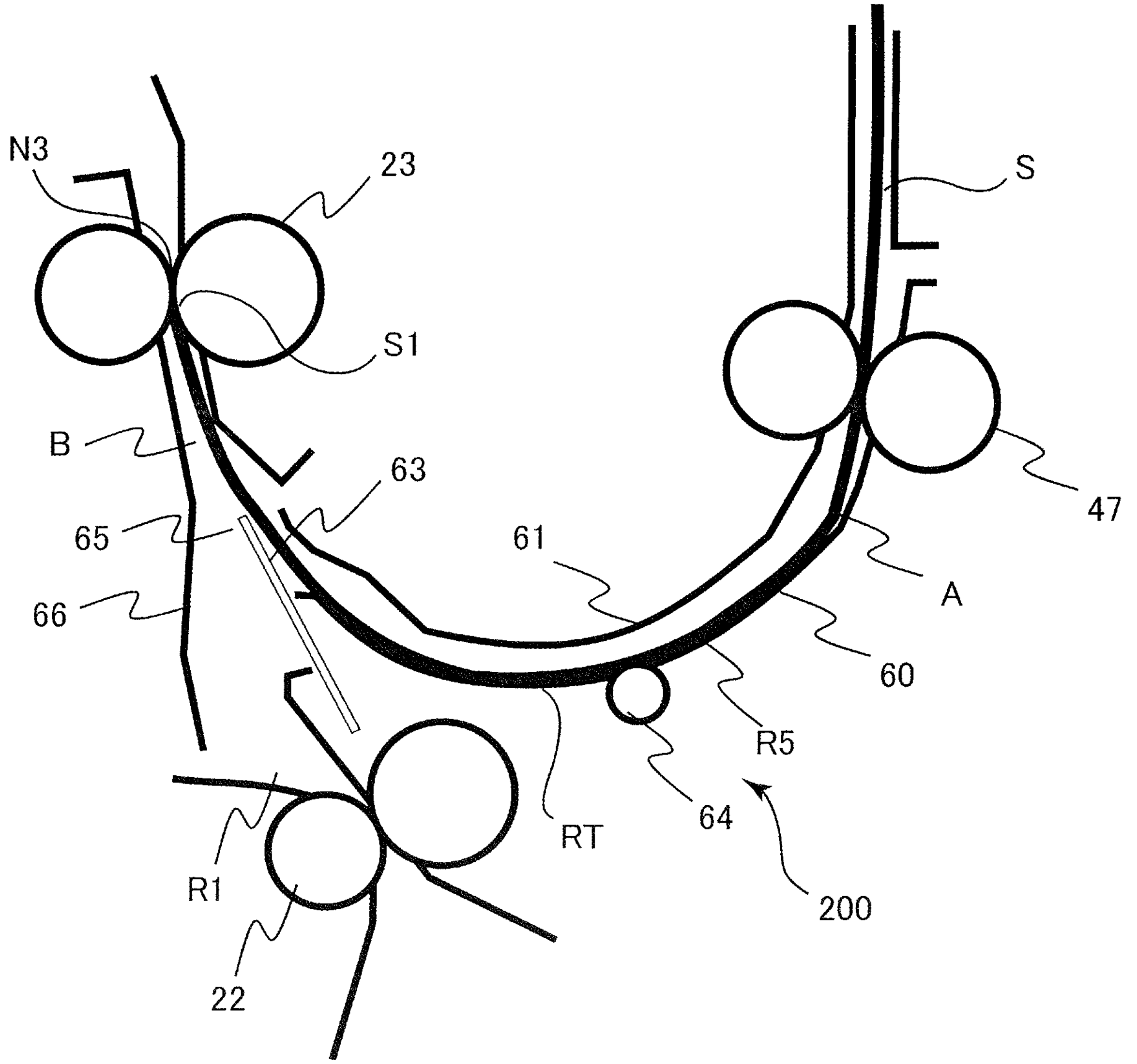
FIG. 5 is a view illustrating a state immediately after a loop is started to be formed on the sheet.

FIG. 5 is a view illustrating a state immediately after a loop is started to be formed on the sheet S. If the conveyance roller pair 47 conveys the sheet S in a state where the leading edge S1 of the sheet S is abutted against the nip N3 of the registration roller pair 23, the sheet S comes into contact with the outer guide 60 from the apex of the U-shaped curve of the sheet S toward the conveyance roller pair 47. Thereby, the space A near the downstream area of the conveyance roller pair 47 in the sheet conveyance direction is filled. This is caused by the frictional resistance between the sheet S and the outer guide 60 at the vicinity of the apex RT of the curved conveyance path R5 suppressing movement of the curved apex portion of the sheet S. Thus, the conveyance force of the conveyance roller pair 47 is transmitted to the sheet S at an upstream area of the apex RT of the curved conveyance path R5, and a loop is formed on the sheet S to fill the space A.

Figure 6:
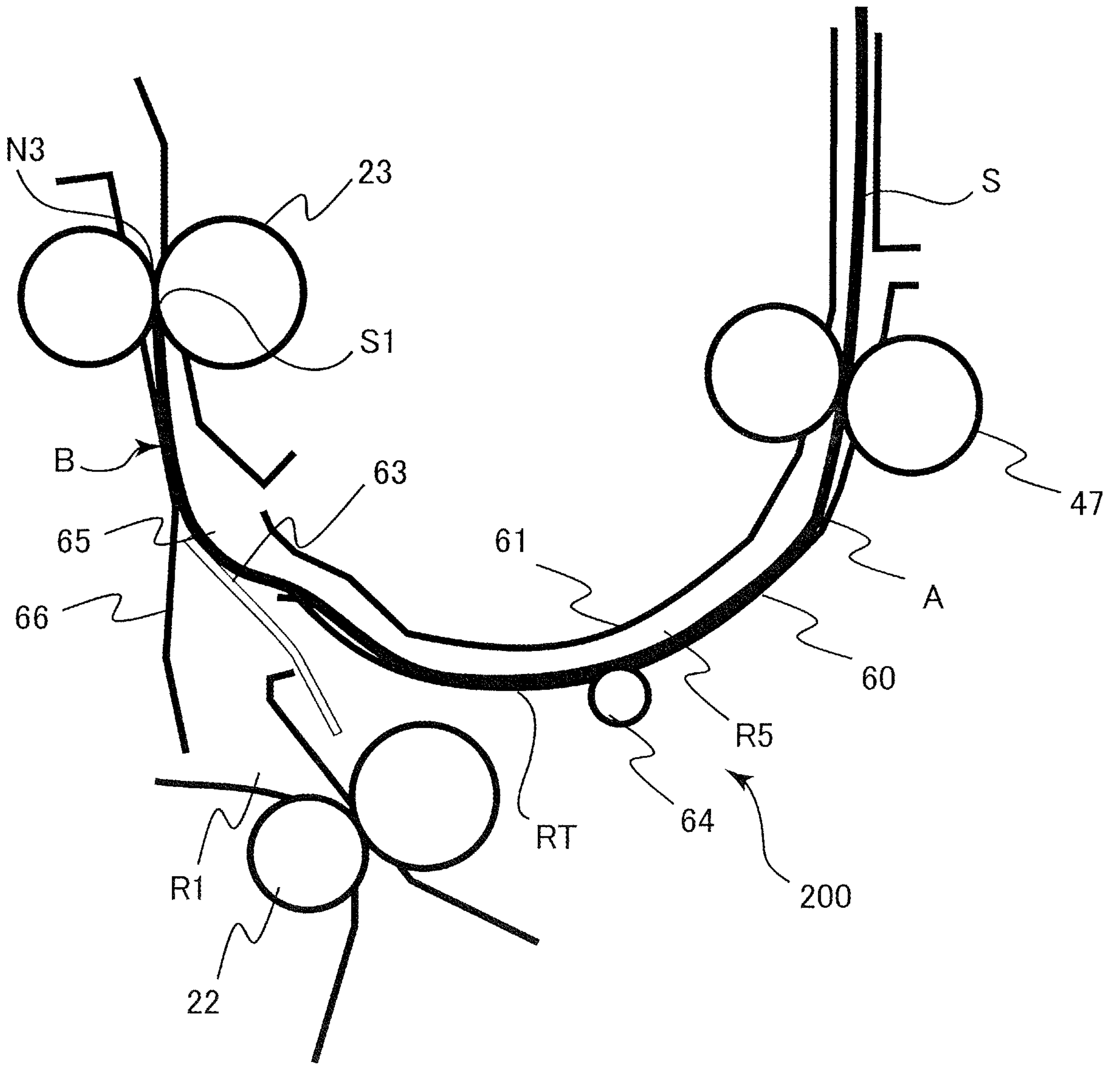
FIG. 6 is a view illustrating a state immediately after formation of a predetermined amount of loop necessary for correcting skewing of the sheet in a loop space.

FIG. 6 is a view illustrating a state immediately after a predetermined amount of loop necessary for correcting skewing of the sheet S has been formed in the loop space 65. If the sheet S abutted against the nip N3 is further conveyed by the conveyance roller pair 47 from the state illustrated in HG 5, the sheet S forms a loop in the loop space 65. In this state, the sheet S comes into contact with the pre-registration guide 66, and the space B is filled. In this state, the frictional resistance at the contact surface between the sheet S and the outer guide 60 tends to maximize. The area of the outer guide 60 where the frictional resistance becomes maximum is a contact portion where the sheet S contacts the outer guide 60 between the area near the apex RT to the conveyance roller pair 47. In the present embodiment, the driven roller 64 is arranged within this area, so as to reduce the frictional resistance between the sheet S and the outer guide 60.

The conveyance force of the conveyance roller pair 47 is used as a force for conveying the sheet S against the frictional resistance and a force for abutting the leading edge S1 of the sheet S against the nip N3 of the registration roller pair 23 to form a loop on the sheet S to correct skewing thereof. That is, as the frictional resistance between the sheet S and the outer guide 60 minimizes, it becomes easier for the conveyance force of the conveyance roller pair 47 to be transmitted to the leading edge S1 of the sheet S. By reducing the frictional resistance between the sheet S and the outer guide 60 by the driven roller 64, the leading edge S1 of the sheet S can be pressed against the nip N3 infallibly and aligned along the nip N3, so that the skew correcting performance can be improved.

Figure 7:
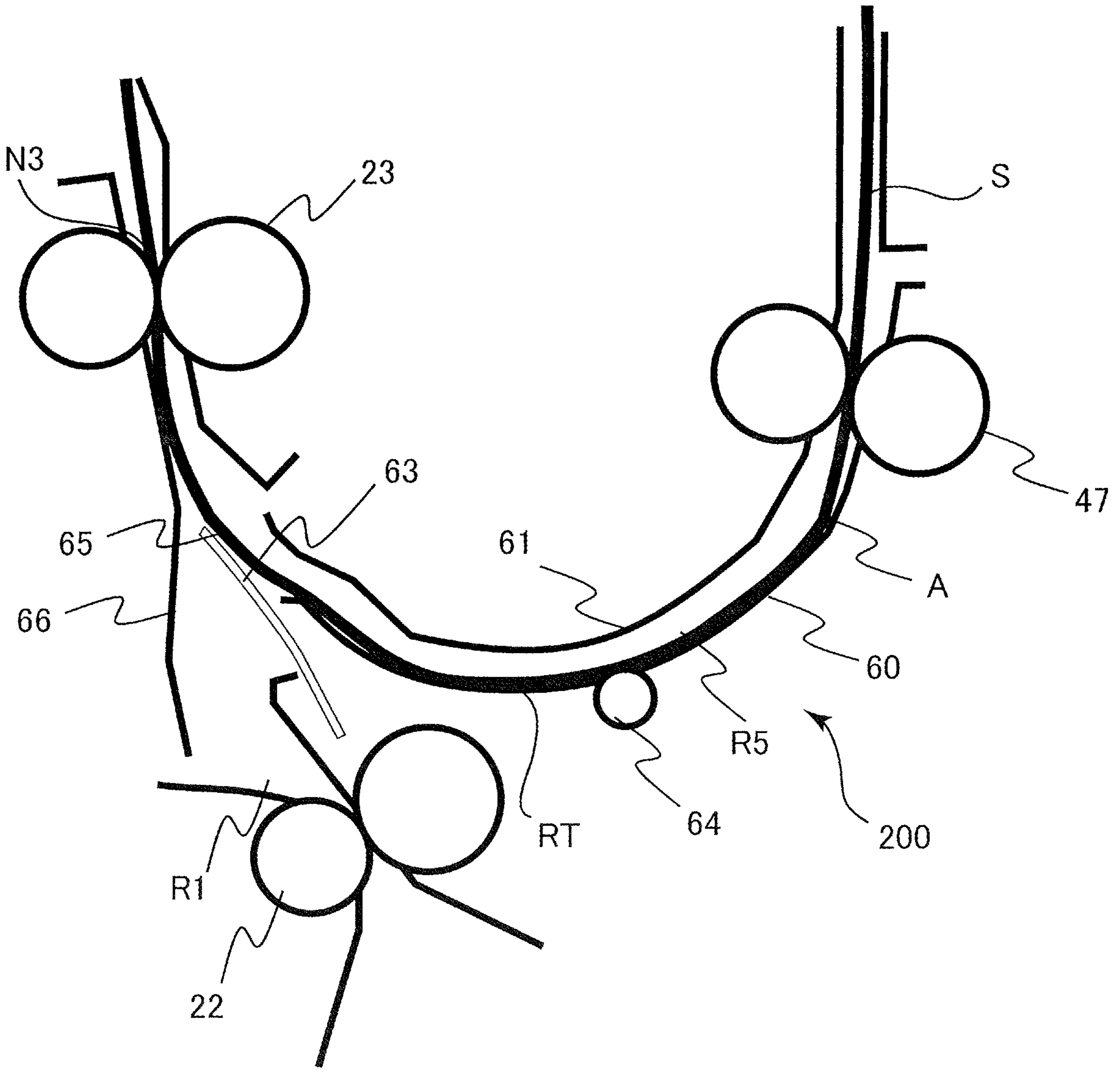
FIG. 7 is a view illustrating a state in which a registration roller pair is conveying the sheet after correcting skewing of the sheet.

FIG. 7 is a view illustrating a state in which the registration roller pair 23 is conveying the sheet S after correcting skewing of the sheet S. After the sheet S is subjected to skew correction by the registration roller pair 23, the registration roller pair 23 starts to rotate, and the sheet S is started to be conveyed toward the transfer nip N1 (refer to FIG. 1). In order for the registration roller pair 23 to convey the sheet S stably, it is necessary to prevent the sheet S from being pulled between the registration roller pair 23 and the conveyance roller pair 47. That is, it is preferable to convey the sheet S while maintaining a certain amount of loop even after skew correction of the sheet S has been performed.

The driven roller 64 is driven to rotate by the sheet S even after skew correction of the sheet S has been performed, and reduces the frictional resistance between the sheet S and the outer guide 60. Thereby, the conveyance force of the conveyance roller pair 47 can be transmitted efficiently to the leading edge of the sheet S, and pulling of the sheet S between the registration roller pair 23 and the conveyance roller pair 47 can be suppressed. Since the sheet S can be conveyed stably, it becomes possible to reduce formation of creases on the sheet S, for example, and image can be transferred highly accurately to the sheet S at the transfer nip N1 (refer to HG 1).

Driven Roller

Figure 8:
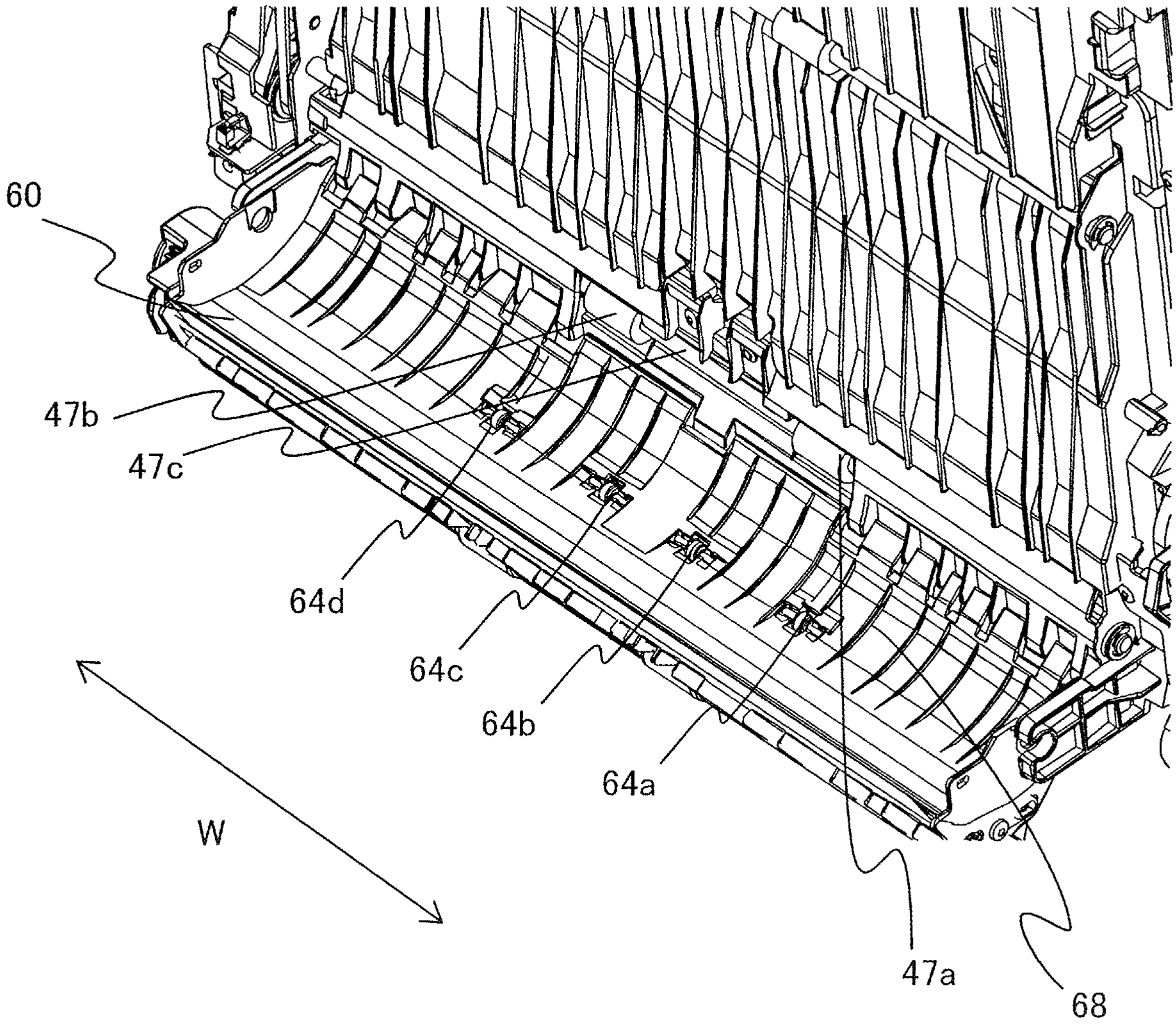
FIG. 8 is a perspective view illustrating a plurality of driven rollers arranged in parallel in a width direction.

Next, the configuration and arrangement of the driven roller 64 will be described in detail. As illustrated in FIG. 8, a plurality of driven rollers 64, the number of which in the present embodiment is four, is arranged in parallel in a width direction W that is orthogonal to the sheet conveyance direction, and in the following description, four driven rollers are respectively referred to as driven rollers 64*a*, 64*b*, 64*c* and 64*d*. Since inertia of the driven roller 64 itself becomes a resistance against the sheet S, the frictional resistance can be reduced further if the inertia of the driven roller 64 itself is small Therefore, according to the present embodiment, four small driven rollers 64*a*, 64*b*, 64*c* and 64*d* are provided to reduce the frictional resistance further. The conveyance roller pair 47 includes two rollers 47*a* and 47*b* which are disposed in parallel in a width direction W, and a shaft portion 47*c* that supports the rollers 47*a* and 47*b* rotatably. Further, a plurality of ribs 68 against which the sheet conveyed by the conveyance roller pair 47 slides is formed on the outer guide 60. Since a plurality of ribs 68 is formed on the outer guide 60 in addition to the driven rollers 64*a*, 64*b*, 64*c* and 64*d*, the sliding resistance between the sheet and the outer guide 60 can be reduced further.

Figure 9:
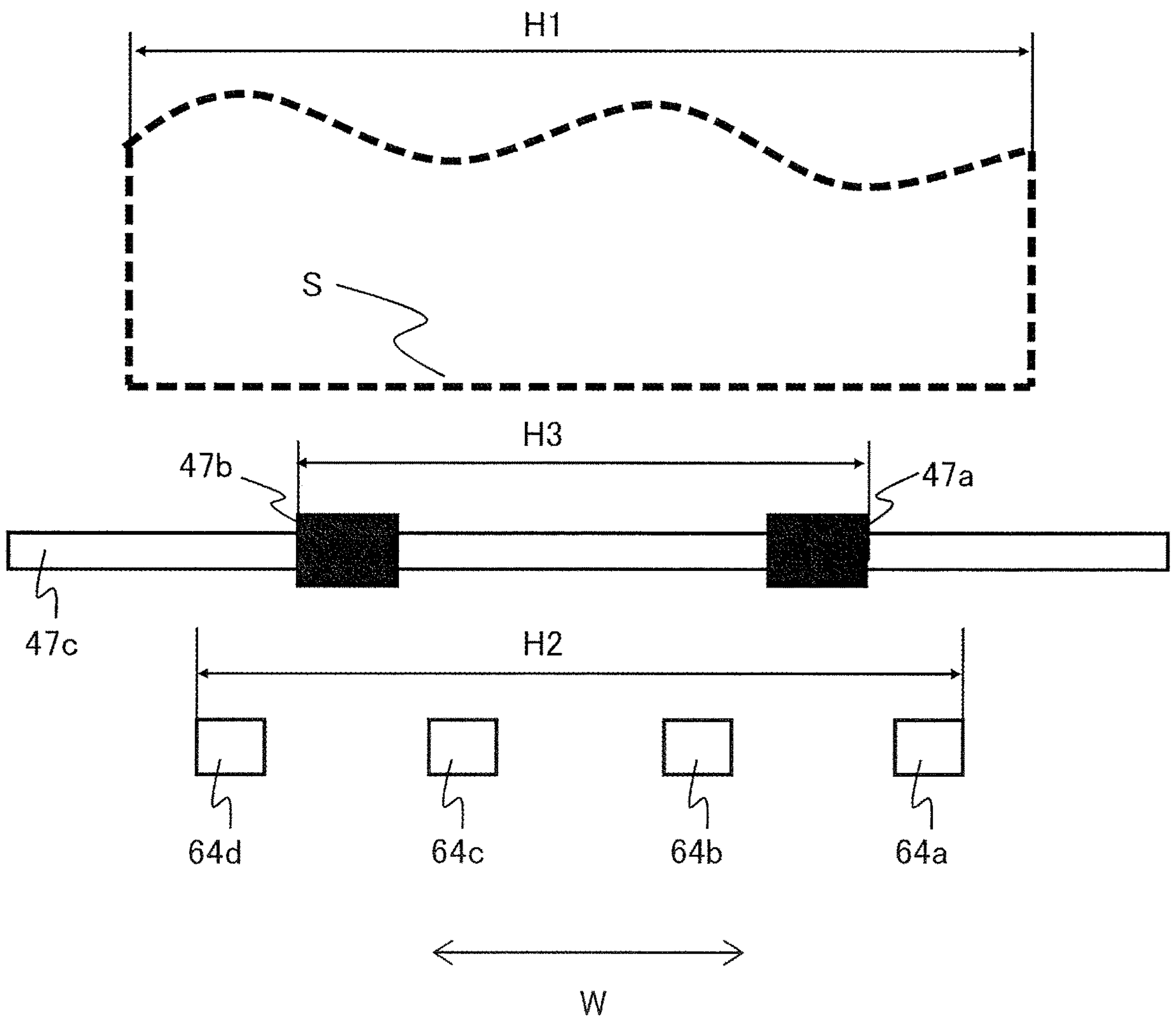
FIG. 9 is a schematic view illustrating arrangement of rollers of a conveyance roller pair and driven rollers.

FIG. 9 is a schematic view illustrating an arrangement of the rollers 47*a* and 47*b* of the conveyance roller pair 47 and the driven rollers 64*a*, 64*b*, 64*c* and 64*d*. For example, if a curl is formed at a corner portion of the sheet S, for example, the sheet S being conveyed may be caught in the driven rollers 64*a*, 64*b*, 64*c* and 64*d*. Therefore, according to the present embodiment, four driven rollers 64*a*, 64*b*, 64*c* and 64*d* are arranged to fit within a sheet width H1 in the width direction W of a minimum sized sheet capable of being conveyed by the printer 100. That is, a distance H2 between an outer side surface of the driven roller 64*a* and an outer side surface of the driven roller 64*d* in the width direction W is not greater than the sheet width H1, and the driven rollers 64*a*, 64*b*, 64*c* and 64*d* are arranged symmetrically with respect to a center of the curved conveyance path R5 in the width direction W.

Further, a conveyance force that is stronger than in other areas act on the sheet S between the rollers 47*a* and 47*b* of the conveyance roller pair 47 in the width direction W. Therefore, it is preferable to provide at least one driven roller within an area H3 between the outer side surface of the roller 47*a* and the outer side surface of the roller 47*b* of the conveyance roller pair 47 in the width direction W. In the present embodiment, two driven rollers 64*b* and 64*c* are arranged within the area H3.

Figure 10:
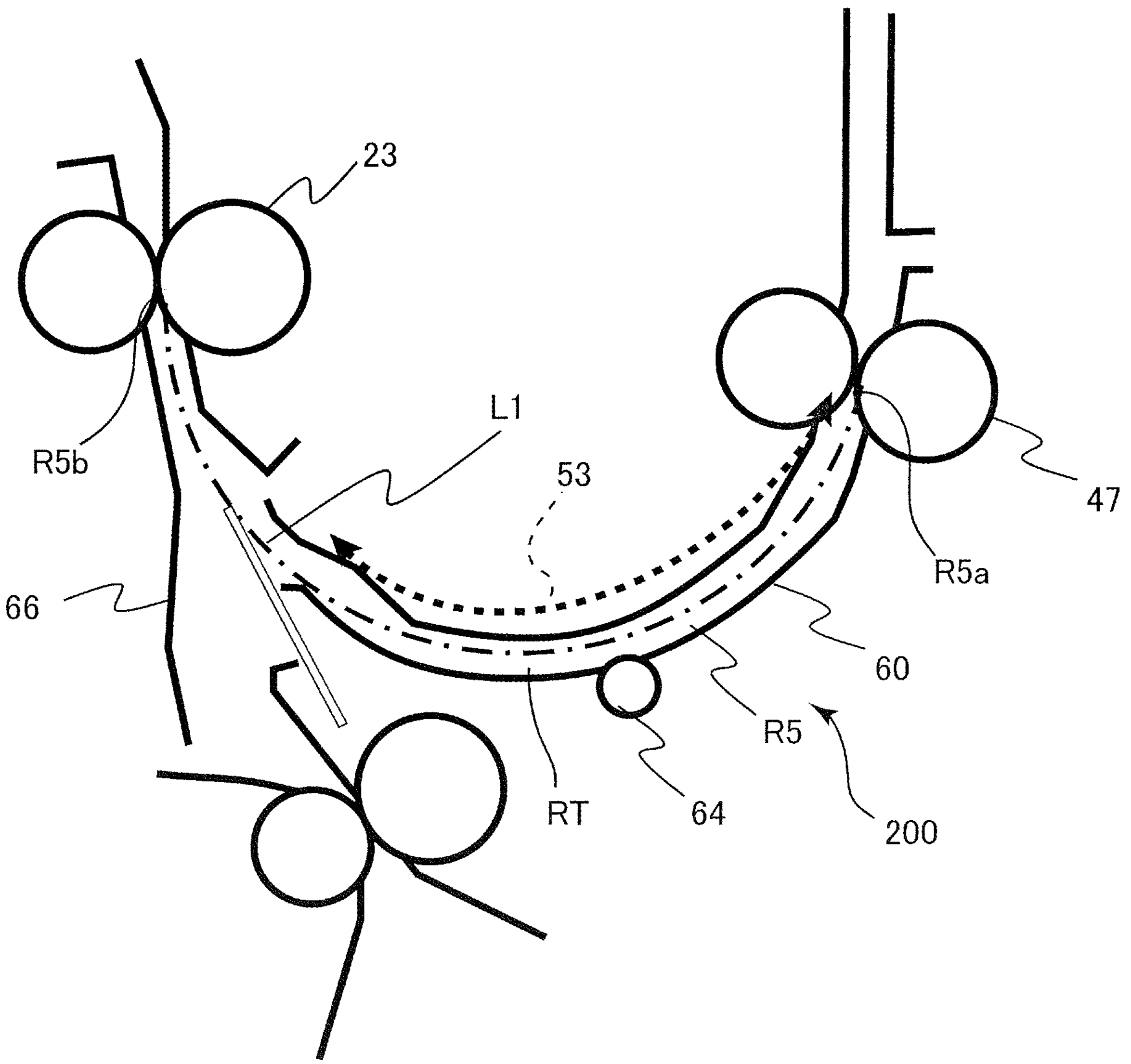
FIG. 10 is an explanatory view illustrating arrangement of driven rollers in a sheet conveyance direction.

FIG. 10 is a view illustrating an arrangement of the driven roller 64 in the sheet conveyance direction. The frictional resistance between the sheet S and the outer guide 60 increases as the curvature of the curved conveyance path R5 increases, so that the driven roller 64 is more effective if a relative angle D (refer to FIG. 2) between the conveyance direction D1 and the conveyance direction D2 approximates 180 degrees. The driven roller 64 is especially effective if the relative angle D forms an angle of 120 degrees or greater. In the present embodiment, it is defined that the conveyance direction D1 and the conveyance direction D2 are approximately opposite directions if the relative angle D between the conveyance direction D1 and the conveyance direction D2 is 120 degrees or greater and 240 degrees or smaller.

In addition, as illustrated in FIG. 10, the driven roller 64 is arranged within a conveyance section 53 that extends from an upstream end R5*a* of the curved conveyance path R5 to three-fifths of a total length L1 of the curved conveyance path R5 which extends from the upstream end R5*a* to a downstream end R5*b* of the curved conveyance path R5 in the sheet conveyance direction. Such arrangement is adopted since the frictional resistance between the sheet S and the outer guide 60 tends to be high in the above-defined conveyance section 53. More specifically, the driven roller 64 should preferably be arranged within the conveyance section between the apex RT which is positioned at the center portion, in the sheet conveyance direction, of the total length L1 and the upstream end R5*a* of the curved conveyance path R5.

As described, according to the present embodiment, the frictional resistance can be reduced by arranging the driven roller 64 that is driven to rotate by the sheet S at a position where the frictional resistance between the sheet S and the outer guide 60 becomes great in the curved conveyance path R5. Thereby, the leading edge S1 of the sheet S can be pressed against the nip N3 infallibly and be aligned along the nip N3, by which the skew correction performance can be improved. Further, the sheet can be conveyed stably after performing skew correction of the sheet S, so that formation of creases on the sheet S can be reduced, and image can be transferred highly accurately to the sheet S at the transfer nip N1.

Second Embodiment

Next, a second embodiment of the present invention will be described. In the second embodiment, the outer guide 60 and the inner guide 61 of the first embodiment are composed of a plurality of guide members. Therefore, configurations similar to the first embodiment are either not shown in the drawings or denoted with the same reference numbers in the drawings.

Figure 11:
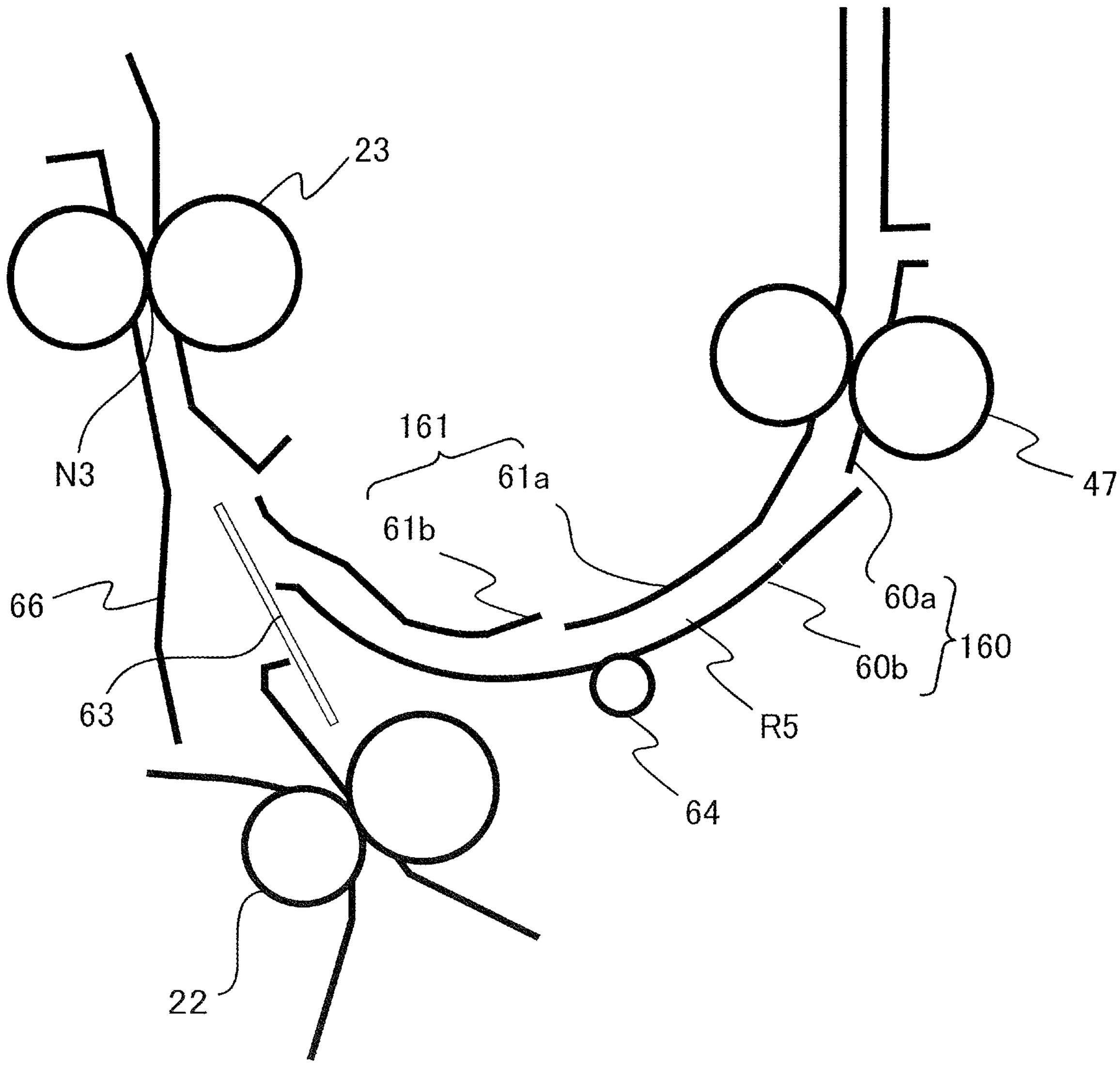
FIG. 11 is a view illustrating a curved conveyance path and a peripheral configuration thereof according to a second embodiment.

As illustrated in FIG. 11, the curved conveyance path R5 is composed of an outer guide 160 serving as a curved guide portion, an inner guide 161 serving as an opposing guide portion, and the pre-registration guide 66. The outer guide 160 includes outer guide members 60*a* and 60*b*, and the inner guide 161 includes inner guide members 61*a* and 61*b*. As described, even if the outer guide 160 and the inner guide 161 are formed of multiple guide members, as long as the sheet S is guided in a curved manner in a state where the leading edge S1 of the sheet S is abutted against the nip N3, the driven roller 64 exerts a similar effect as the first embodiment.

Third Embodiment

Next, a third embodiment according to the present invention will be described. The third embodiment adopts a configuration where the conveyance roller pair 47 and the registration roller pair 23 are arranged at positions other than the upstream end R5*a* and the downstream end R5*b* in the sheet conveyance direction of the curved conveyance path R5. Therefore, configurations similar to the first embodiment are either not shown in the drawings or denoted with the same reference numbers in the drawings.

Figure 12:
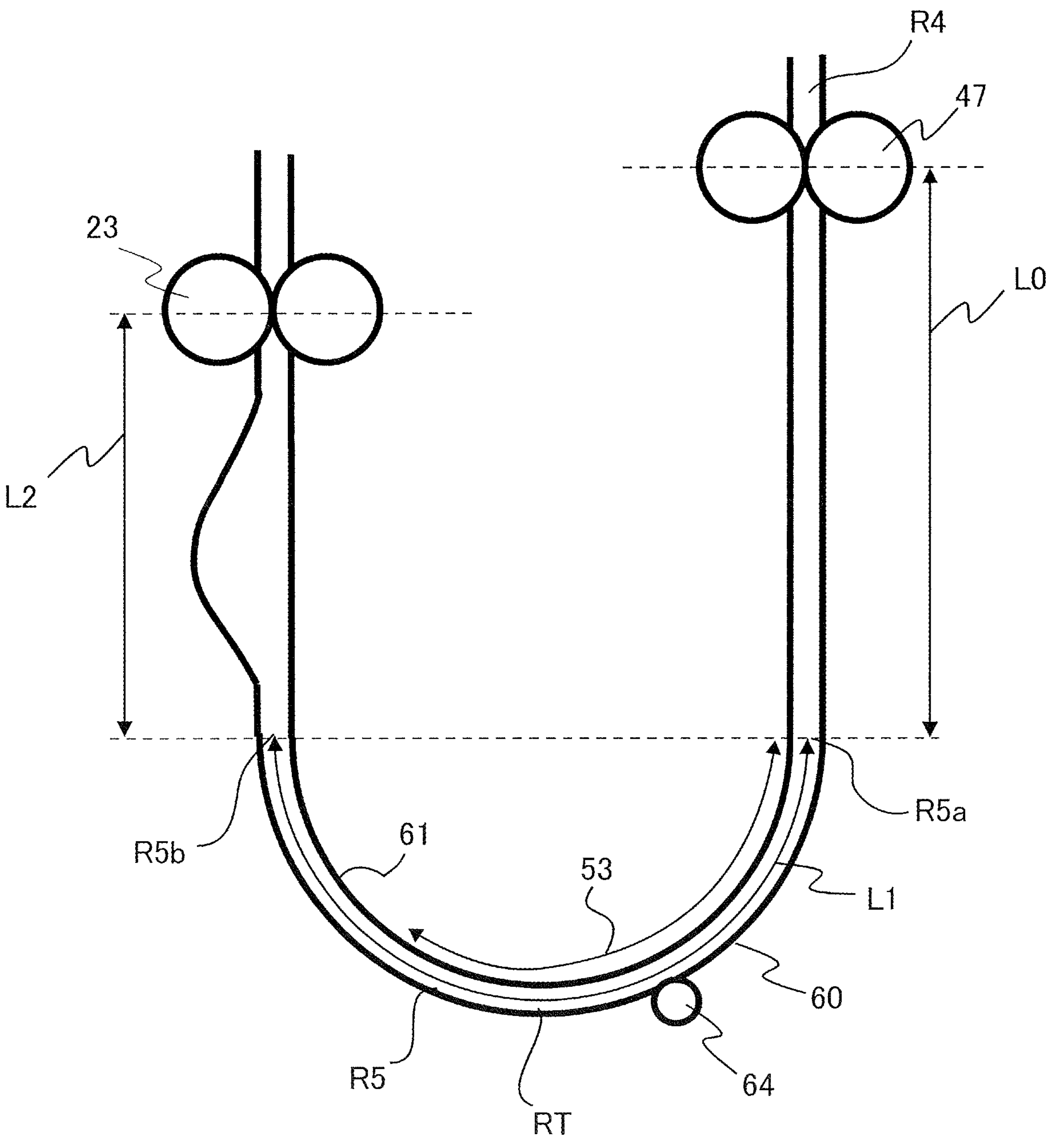
FIG. 12 is a view illustrating a configuration of a duplex printing conveyance path according to a third embodiment.

According to the present embodiment, as illustrated in FIG. 12, the conveyance roller pair 47 is arranged upstream for distance L0 from the upstream end R5*a* of the curved conveyance path R5 in the sheet conveyance direction, and the registration roller pair 23 is arranged downstream for distance L2 from the downstream end R5*b* in the sheet conveyance direction. That is, the present invention is not limited to a configuration as in the first embodiment where the conveyance roller pair 47 and the registration roller pair 23 are arranged on upstream and downstream ends of the curved conveyance path R5.

Even according to the present embodiment, the driven roller 64 should preferably be arranged at a position along the conveyance section 53 that extends from the upstream end R5*a* of the curved conveyance path R5 to three-fifths of the total length L1 of the curved conveyance path R5 which extends from the upstream end R5*a* to the downstream end R5*b* of the curved conveyance path R5 in the sheet conveyance direction. More specifically, the driven roller 64 should preferably be arranged at a position along the conveyance section between the apex RT that is positioned at the center of the total length L1 in the sheet conveyance direction and the upstream end R5*a* of the curved conveyance path R5.

In the present embodiment, an example has been described where the driven roller 64 is arranged in the curved conveyance path R5 that constitutes a portion of the duplex printing conveyance path R4, but the present invention is not limited thereto. For example, the path is not limited to the duplex printing conveyance path R4 through which the sheet S passes during duplex printing, but the driven roller 64 can be arranged in any conveyance path in which the sheet S is conveyed in a curved manner, such as the feed conveyance path R1, the sheet discharge conveyance path R2 and the sheet reverse conveyance path R3.

Further, in all the embodiments described above, the leading edge S1 of the sheet S has been abutted against the nip N3 of the registration roller pair 23 to correct skewing, but the present invention is not limited thereto. For example, a shutter member serving as an abutment portion can be provided upstream of the nip N3 in the sheet conveyance direction, and the leading edge S1 of the sheet S can be abutted against the shutter member to correct skewing of the sheet. In all the embodiments described above, the inner guide 61 or 161 is opposed to the outer guide 60 or 160, but the inner guide 61 or 161 can be omitted.

Further, in all the embodiments described above, the printer 100 adopting an electrophotographic system was described as an example, but the present invention is not limited to this example. For example, the present invention can be applied to an image forming apparatus adopting an ink-jet system in which ink is discharged through nozzles to form an image on a sheet.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-231965, filed Dec. 11, 2018, which is hereby incorporated by reference herein in its entirety.

What is claimed is:

1. A sheet conveyance apparatus comprising:

a sheet supporting portion configured to support a sheet;

a sheet feeder configured to feed the sheet supported on the sheet supporting portion;

a first roller configured to convey the sheet fed by the sheet feeder;

a second roller configured to convey the sheet fed by the sheet feeder and to rotate about a common axis with the first roller;

an abutment member against which a leading edge of a sheet conveyed by the first roller and the second roller abuts, a loop on the sheet being formed in a case where the leading edge of the sheet conveyed by the first roller and the second roller abuts against the abutment member;

a first guide configured to guide the sheet conveyed by the first roller and the second roller to the abutment member;

a second guide configured to guide the sheet conveyed by the first roller and the second roller to the abutment member, the second guide being opposed to the first guide and defining a conveyance path having a curved area between the first and second rollers and the abutment member with the first guide, the conveyance path and the first guide being arranged outside the second guide in a direction of curvature of the curved area;

a first rotary member configured not to nip the sheet which is conveyed by the first roller and the second roller and arranged outside the second guide in the direction of curvature of the curved area so as to be rotated by a surface of the sheet that is guided by the first guide;

a second rotary member configured not to nip the sheet which is conveyed by the first roller and the second roller and arranged outside the second guide in the direction of curvature of the curved area so as to be rotated by the surface of the sheet that is guided by the first guide; and a third rotary member configured not to nip the sheet which is conveyed by the first roller and the second roller and arranged outside the second guide in the direction of curvature of the curved area so as to be rotated by the surface of the sheet that is guided by the first guide, wherein at least a part of the first rotary member, at least a part of the second rotary member, and at least a part of the third rotary member are arranged in the curved area, the first roller is arranged on a first side with respect to the second roller in a width direction orthogonal to a sheet conveyance direction, the first rotary member is arranged on the first side with respect to the first roller in the width direction, the second rotary member is arranged on a second side opposed to the first side with respect to the second roller in the width direction, the third rotary member is arranged between the first roller and the second roller in the width direction, and the first rotary member, the second rotary member, and the third rotary member are arranged so as to be overlapped with each other as viewed in the width direction.

2. The sheet conveyance apparatus according to claim 1, wherein the first roller and the second roller are provided on an upstream end portion of the conveyance path in the sheet conveyance direction, and the abutment member is provided on a downstream end portion of the conveyance path in the sheet conveyance direction.

3. The sheet conveyance apparatus according to claim 1, wherein the first roller and the second roller are configured to nip and convey the sheet, the abutment member includes a roller pair configured to nip and convey the sheet, and a conveyance direction in which the first roller and the second roller convey the sheet is approximately opposite to a conveyance direction in which the roller pair conveys the sheet.

4. The sheet conveyance apparatus according to claim 1, wherein the first roller and the second roller are configured to nip and convey the sheet, the abutment member includes a roller pair configured to nip and convey the sheet, and an angle formed by a vector having a conveyance direction in which the first roller and the second roller convey the sheet and a vector having a conveyance direction in which the roller pair conveys the sheet is 120 degrees or greater and 240 degrees or smaller.

5. The sheet conveyance apparatus according to claim 1, wherein the first guide includes a rib configured to slide the sheet conveyed by the first roller and the second roller.

6. The sheet conveyance apparatus according to claim 1, wherein the abutment member includes a roller pair configured to nip and convey the sheet.

7. The sheet conveyance apparatus according to claim 1, further comprising a roller pair configured to nip and convey the sheet after the leading edge of the sheet is abutted against the abutment member.

8. The sheet conveyance apparatus according to claim 1, wherein the first rotary member, the second rotary member, and the third rotary member are arranged to reduce a frictional resistance between the sheet and the first guide in the curved area.

9. The sheet conveyance apparatus according to claim 1, wherein the first rotary member, the second rotary member, and the third rotary member are arranged within a conveyance section that extends from an upstream end of the conveyance path to three-fifths of a total length of the conveyance path which extends from the first roller and the second roller to the abutment member in the sheet conveyance direction.

10. The sheet conveyance apparatus according to claim 1, further comprising:

a fourth rotary member configured not to nip the sheet which is conveyed by the first roller and the second roller and arranged outside the second guide in the direction of curvature of the curved area so as to be rotated by the surface of the sheet that is guided by the first guide, wherein at least a part of the fourth rotary member is arranged in the curved area, the first rotary member, the second rotary member, the third rotary member, and the fourth rotary member are arranged in different positions in the width direction, and the third rotary member and the fourth rotary member are arranged between the first roller and the second roller in the width direction.

11. The sheet conveyance apparatus according to claim 10, wherein the first rotary member and the second rotary member are arranged symmetrically with respect to a center of the conveyance path in the width direction, and wherein the third rotary member and the fourth rotary member are arranged symmetrically with respect to the center of the conveyance path in the width direction.

12. An image forming apparatus comprising:

the sheet conveyance apparatus according to claim 1; and an image former configured to form an image on a sheet.

13. The image forming apparatus according to claim 12, further comprising a duplex printing conveyance path configured to guide the sheet on which an image has been formed by the image former to the image former again, wherein the conveyance path constitutes a portion of the duplex printing conveyance path.

14. The sheet conveyance apparatus according to claim 1, wherein the curved area has a U-shape including (i) a first curved area that downwardly extends from the first roller and the second roller to an apex of the U-shape and (ii) a second curved area that upwardly extends to the abutment member and is disposed downstream of the first curved area in the sheet conveyance direction, and wherein at least a part of the first rotary member, at least a part of the second rotary member, and at least a part of the third rotary member are arranged in the first curved area.

15. An image forming apparatus comprising:

a sheet supporting portion configured to support a sheet;

a sheet feeder configured to feed the sheet supported on the sheet supporting portion;

an image former configured to form an image on the sheet fed by the sheet feeder;

a first roller configured to convey the sheet on which the image is formed;

a second roller configured to convey the sheet fed by the sheet feeder and to rotate about a common axis with the first roller;

an abutment member against which a leading edge of a sheet conveyed by the first roller and the second roller abuts, a loop on the sheet being formed in a case where the leading edge of the sheet conveyed by the first roller and the second roller abuts against the abutment member;

a first guide configured to guide the sheet conveyed by the first roller and the second roller to the abutment member;

a second guide configured to guide the sheet conveyed by the first roller and the second roller to the abutment member, the second guide being opposed to the first guide and defining a conveyance path having a curved area between the first and second rollers and the abutment member with the first guide, the conveyance path and the first guide being arranged outside the second guide in a direction of curvature of the curved area;

a first rotary member configured not to nip the sheet which is conveyed by the first roller and the second roller and arranged outside the second guide in the direction of curvature of the curved area so as to be rotated by a surface of the sheet that is guided by the first guide;

a second rotary member configured not to nip the sheet which is conveyed by the first roller and the second roller and arranged outside the second guide in the direction of curvature of the curved area so as to be rotated by the surface of the sheet that is guided by the first guide; and a third rotary member configured not to nip the sheet which is conveyed by the first roller and the second roller and arranged outside the second guide in the direction of curvature of the curved area so as to be rotated by the surface of the sheet that is guided by the first guide, wherein at least a part of the first rotary member, at least a part of the second rotary member, and at least a part of the third rotary member are arranged in the curved area, the first roller is arranged on a first side with respect to the second roller in a width direction orthogonal to a sheet conveyance direction, the first rotary member is arranged on the first side with respect to the first roller in the width direction, the second rotary member is arranged on a second side opposed to the first side with respect to the second roller in the width direction, the third rotary member is arranged between the first roller and the second roller in the width direction, and the first rotary member, the second rotary member, and the third rotary member are arranged so as to be overlapped with each other as viewed in the width direction.

16. A sheet conveyance apparatus comprising:

a first conveyer including a first roller and a second roller configured to convey a sheet, the second roller being further configured to rotate about a common axis with the first roller;

a second conveyer configured to convey the sheet;

a first guide configured to guide the sheet conveyed by the first conveyer to the second conveyer;

a second guide configured to guide the sheet conveyed by the first conveyer to the second conveyer, the second guide being opposed to the first guide and defining a conveyance path having a curved area between the first conveyer and the second conveyer with the first guide, the conveyance path and the first guide being arranged outside the second guide in a direction of curvature of the curved area;

a first rotary member configured not to nip the sheet which is conveyed by the first roller and the second roller and arranged outside the second guide in the direction of curvature of the curved area so as to be rotated by a surface of the sheet that is guided by the first guide;

a second rotary member configured not to nip the sheet which is conveyed by the first roller and the second roller and arranged outside the second guide in the direction of curvature of the curved area so as to be rotated by the surface of the sheet that is guided by the first guide; and a third rotary member configured not to nip the sheet which is conveyed by the first roller and the second roller and arranged outside the second guide in the direction of curvature of the curved area so as to be rotated by the surface of the sheet that is guided by the first guide, wherein at least a part of the first rotary member, at least a part of the second rotary member, and at least a part of the third rotary member are arranged in the curved area, the first roller is arranged on a first side with respect to the second roller in a width direction orthogonal to a sheet conveyance direction, the first rotary member is arranged on the first side with respect to the first roller in the width direction, the second rotary member is arranged on a second side opposed to the first side with respect to the second roller in the width direction, the third rotary member is arranged between the first roller and the second roller in the width direction, and the first rotary member, the second rotary member, and the third rotary member are arranged so as to be overlapped with each other as viewed in the width direction.

* * * * *